United States Patent
Sato

(10) Patent No.: US 9,652,687 B2
(45) Date of Patent: May 16, 2017

(54) IMAGE PROCESSING APPARATUS THAT PERFORMS DEVELOPMENT BY ADJUSTING SATURATION LEVEL OF EACH COLOR SIGNAL, IMAGE PROCESSING METHOD, AND STORAGE MEDIUM

(71) Applicant: CANON KABUSHIKI KAISHA, Tokyo (JP)

(72) Inventor: Noriaki Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 14/626,387

(22) Filed: Feb. 19, 2015

(65) Prior Publication Data

US 2015/0245000 A1    Aug. 27, 2015

(30) Foreign Application Priority Data

Feb. 21, 2014    (JP) ................................. 2014-031631

(51) Int. Cl.
*H04N 5/228* (2006.01)
*H04N 9/73* (2006.01)
(Continued)

(52) U.S. Cl.
CPC ......... *G06K 9/4652* (2013.01); *H04N 1/6005* (2013.01); *H04N 1/6027* (2013.01); *H04N 9/735* (2013.01)

(58) Field of Classification Search
CPC ....... H04N 5/23219; H04N 2201/0084; H04N 2201/328; H04N 1/2112; H04N 1/6027;
(Continued)

(56) References Cited

U.S. PATENT DOCUMENTS

| 6,868,179 B2 | 3/2005 | Gruzdev et al. |
| 7,286,702 B2 | 10/2007 | Oohara |

(Continued)

FOREIGN PATENT DOCUMENTS

| CN | 1418003 A | 5/2003 |
| CN | 1536530 A | 10/2004 |

(Continued)

OTHER PUBLICATIONS

U.S. Appl. No. 14/625,851, filed Feb. 19, 2015.
(Continued)

*Primary Examiner* — Trung Diep
(74) *Attorney, Agent, or Firm* — Rossi, Kimms & McDowell LLP

(57) ABSTRACT

An image processing apparatus capable of performing development by adjusting the saturation level of each color signal, without losing gradation in a high-luminance area. Saturation levels of color signals of three colors are calculated on photographed data. Color signal values in each pixel of the photographed data are acquired as pixel information. If it is determined, based on the saturation levels and the pixel information, to perform substitution, substitution for a color signal having the second highest saturation level is performed according to a color signal having the highest saturation level, and substitution for a color signal having the lowest saturation level is performed according to the color signals having the highest and second highest saturation levels. Predetermined processing is performed on photographed data on which substitution processing has been performed to thereby generate the developed data.

14 Claims, 10 Drawing Sheets

(51) Int. Cl.
  *G06K 9/00* (2006.01)
  *G06K 9/46* (2006.01)
  *H04N 1/60* (2006.01)

(58) Field of Classification Search
  CPC ......... H04N 1/6086; H04N 2201/3256; H04N 2201/3257; H04N 2209/046; H04N 5/217; G06T 5/003; G06T 2207/10024; G06T 5/002
  USPC .................. 348/222.1, 223.1; 382/167, 274
  See application file for complete search history.

(56) References Cited

U.S. PATENT DOCUMENTS

| | | | |
|---|---|---|---|
| 7,418,132 B2 * | 8/2008 | Hoshuyama | ............ G06T 5/20 382/162 |
| 8,384,799 B2 | 2/2013 | Tanabe | |
| 2007/0103744 A1 * | 5/2007 | Chiba | .................... H04N 9/646 358/518 |
| 2008/0284877 A1 * | 11/2008 | Jaspers | .................. H04N 9/646 348/241 |
| 2010/0208097 A1 * | 8/2010 | Tanabe | .................. H04N 1/409 348/223.1 |

FOREIGN PATENT DOCUMENTS

| | | |
|---|---|---|
| CN | 1613089 A | 5/2005 |
| CN | 101729913 A | 6/2010 |
| JP | 2000-013808 A | 1/2000 |
| JP | 2004-328564 A | 11/2004 |
| JP | 2012085360 A | 4/2012 |

OTHER PUBLICATIONS

Office Action issued in Chinese Application No. CN201510087873.5, mailed Aug. 22, 2016. English translation provided.

Notice of Allowance issued in U.S. Appl. No. 14/625,851 mailed Sep. 27, 2016.

* cited by examiner

IMAGE PROCESSING APPARATUS THAT PERFORMS DEVELOPMENT BY ADJUSTING SATURATION LEVEL OF EACH COLOR SIGNAL, IMAGE PROCESSING METHOD, AND STORAGE MEDIUM

BACKGROUND OF THE INVENTION

Field of the Invention

The present invention relates to an image processing technique for developing photographed data, and more particularly to an image processing technique that makes it possible to reflect a dynamic range of photographed data on image data after development.

Description of the Related Art

Conventionally, in developing photographed data, so-called white balance adjustment is performed for adjusting color signals by taking into account characteristics of an image pickup apparatus that has acquired the photographed data and photographing conditions. Through the white balance adjustment, if an object has a gray color, an image of the object as a result of the development is output in which the gray color is formed by the color signals made uniform in level.

However, in a case where the color signals become different in saturation level after white balance adjustment, proper white balance adjustment cannot be performed, and so-called coloring is sometimes caused in a high-luminance area of the image.

To solve this problem, there has been proposed a method in which a clip level is set according to the level of a color signal R before or after white balance adjustment, and color signals G and B which have been subjected to white balance adjustment are clipped at the set clip level (see Japanese Patent Laid-Open Publication No. 2000-13808).

Further, there has been proposed a method in which whether or not each color signal is in a saturated state is determined after performing white balance adjustment, and a color signal determined to be saturated is corrected according to a level of the other color signal different from the color signal in the saturated state (see Japanese Patent Laid-Open Publication No. 2004-328564).

However, in the method described in Japanese Patent Laid-Open Publication No. 2000-13808, information on color signals exceeding the clip level is lost, so that it is impossible to express gradation of a high-luminance area in the result of the development.

Further, in the method described in Japanese Patent Laid-Open Publication No. 2004-328564, correction dependent on the color signal level is insufficient. More specifically, when gradation in which a color and a luminance gradually change is developed, tone jump sometimes occurs in which a color signal is largely changed at a boundary between a non-saturated state and a saturated state. As a result of correction performed using color signals different in saturation level, coloring remains in a high-luminance area.

SUMMARY OF THE INVENTION

The present invention provides an image processing apparatus that is capable of performing development by adjusting the saturation level of each color signal, without losing gradation in a high-luminance area, an image processing method, and a storage medium.

In a first aspect of the present invention, there is provided an image processing apparatus that acquires developed data by developing photographed data, comprising a saturation level calculation unit configured to calculate a saturation level of each of color signals of three colors of the photographed data, a pixel information acquisition unit configured to acquire color signal values in each pixel of the photographed data as pixel information, a determination unit configured to determine, based on the saturation levels and the pixel information, whether or not to perform substitution for any of the color signals, a substitution processing unit configured, when it is determined by the determination unit that the substitution is to be performed, to perform substitution, for a color signal having the second highest saturation level, according to a color signal having the highest saturation level, and for a color signal having the lowest saturation level, according to the color signal having the highest saturation level and the color signal having the second highest saturation level, and a development processing unit configured to perform predetermined processing on photographed data on which substitution processing has been performed by the substitution processing unit to thereby generate the developed data.

In a second aspect of the present invention, there is provided an image processing method for acquiring developed data by developing photographed data, comprising calculating a saturation level of each of color signals of three colors of the photographed data, acquiring color signal values in each pixel of the photographed data as pixel information, determining, based on the saturation levels and the pixel information, whether or not to perform substitution for any of the color signals, performing, when it is determined by said determining that the substitution is to be performed, substitution, for a color signal having the second highest saturation level, according to a color signal having the highest saturation level, and for a color signal having the lowest saturation level, according to the color signal having the highest saturation level and the color signal having the second highest saturation level, and performing predetermined processing on photographed data on which substitution processing has been performed, to thereby generate the developed data.

In a third aspect of the present invention, there is provided a non-transitory computer-readable storage medium storing a computer-executable control program for causing a computer to execute a method of controlling an image processing apparatus that acquires developed data by developing photographed data, wherein the method comprises calculating a saturation level of each of color signals of three colors of the photographed data, acquiring color signal values in each pixel of the photographed data as pixel information, determining, based on the saturation levels and the pixel information, whether or not to perform substitution for any of the color signals, performing, when it is determined by said determining that the substitution is to be performed, substitution, for a color signal having the second highest saturation level, according to a color signal having the highest saturation level, and for a color signal having the lowest saturation level, according to the color signal having the highest saturation level and the color signal having the second highest saturation level, and performing predetermined processing on photographed data on which substitution processing has been performed, to thereby generate the developed data.

According to the present invention, the substitution process is performed according to the saturation level and the pixel information. Therefore, it is possible to perform development by adjusting the saturation level of each color signal, without losing gradation in a high-luminance area.

Further features of the present invention will become apparent from the following description of exemplary embodiments (with reference to the attached drawings).

BRIEF DESCRIPTION OF THE DRAWINGS

FIGS. 4A to 4D are diagrams useful in explaining RAW data after substitution, generated by the substitution process shown in FIG. 3, in which FIG. 4A shows a state in which all of color signals reach respective saturation levels after white balance adjustment, FIG. 4B shows an example of a state where some of the color signals reach the saturation level after white balance adjustment, FIG. 4C shows another example of the state where some of the color signals reach the saturation level after white balance adjustment, and FIG. 4D shows a state in which one of the color signals reaches the saturation level after white balance adjustment.

FIGS. 8A to 8D are diagrams useful in explaining RAW data after substitution, generated by the substitution process shown in FIG. 7, in which FIG. 8A shows a state in which all of color signals reach respective saturation levels after white balance adjustment, FIG. 8B shows an example of a state where some of the color signals reach the saturation level after white balance adjustment, FIG. 8C shows another example of the state where some of the color signals reach the saturation level after white balance adjustment, and FIG. 8D shows a state in which one of the color signals reaches the saturation level after white balance adjustment.

FIGS. 11A to 11C are diagrams useful in explaining improvement of gradation in a high-luminance area by the substitution process by the substitution processor in a result of development processing performed by a development section appearing in FIG. 1, in which FIG. 11A shows a conventional development result, FIG. 11B shows a development result obtained in the second embodiment, and FIG. 11C shows a development result obtained in the third embodiment.

DESCRIPTION OF THE EMBODIMENTS

The present invention will now be described in detail below with reference to the accompanying drawings showing embodiments thereof.

Figure 1:
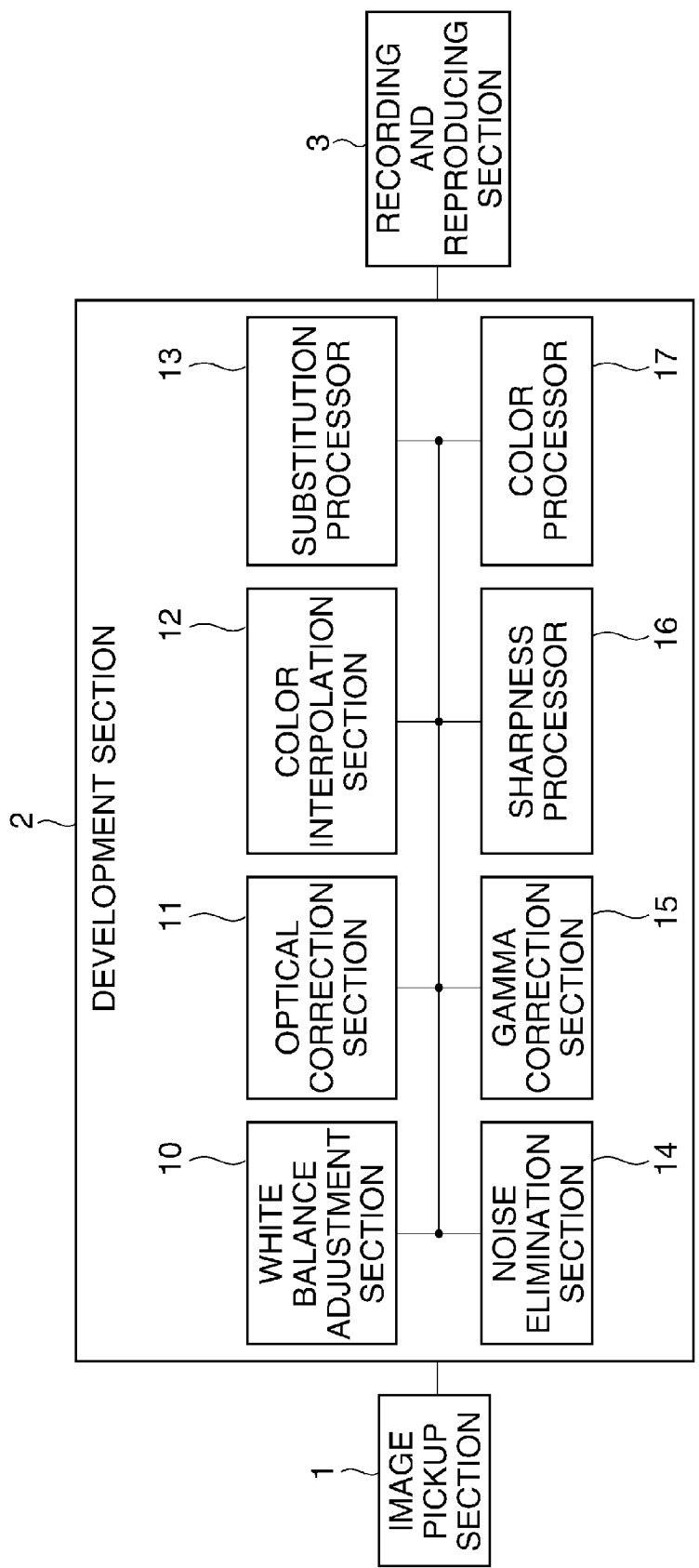
FIG. 1 is a block diagram of an image pickup apparatus (digital camera) which is an image processing apparatus according to a first embodiment of the present invention.

FIG. 1 is a block diagram of an image pickup apparatus which is an image processing apparatus according to a first embodiment of the present invention.

The image pickup apparatus shown in FIG. 1 is e.g. a digital camera (hereinafter simply referred to as the camera), and includes an image pickup section 1. The image pickup section 1 includes a photographic lens unit (hereinafter simply referred to as the lens), an image pickup device, and a photometric section, and outputs photographed data (hereinafter referred to as RAW data). Note that the RAW data includes undeveloped photographed data and photographed data on which part of developing processing has been performed.

A development section 2 develops RAW data output from the image pickup section 1 to thereby generate developed data (i.e. image data). A recording and reproducing section 3 records RAW data output from the image pickup section 1 and developed data output from the development section 2 in an external storage device (not shown) as recorded data, reads out the recorded data recorded in the external storage device to provide the read data to the development section 2.

The illustrated camera includes the image pickup section 1, the development section 2, and the recording and reproducing section 3, as described above, and hence is capable of performing photographing and development. Further, when performing photographing, the camera can record developed data in the external storage device, read out RAW data from the external storage device at a desired timing, and develop the read RAW data.

Note that the camera may include only the image pickup section 1 and the recording and reproducing section 3, and develop RAW data using an external information processing apparatus provided with a development section and a recording and reproducing section.

The development section 2 appearing in FIG. 1 includes a white balance adjustment section 10, an optical correction section 11, a color interpolation section 12, a substitution processor 13, a noise elimination section 14, a gamma correction section 15, a sharpness processor 16, and a color processor 17. These sections and processors are interconnected.

The white balance adjustment section 10 multiplies each of signal values of color signals of RAW data by a white balance coefficient. With this, the white balance adjustment section 10 adjusts the signal level of each color, and thereby outputs the gray color of an object image as one formed by the color signals made uniform in level.

In the present embodiment, the image pickup section 1 extracts signal values of respective color signals from part of areas of the RAW data to determine white balance coefficients, and sends the white balance coefficients to the development section 2 together with the RAW data. Note that the image pickup section 1 may determine the white balance coefficients using any other suitable known method, such as a method using photometry results obtained by the photometric section.

The white balance coefficient is a value indicative of a gain amount applied to each color signal, which is determined on a color signal-by-color signal basis, and when the signal values of the color signals are multiplied by the respective white balance coefficients associated therewith, the gray color of an object image is represented by the color signals each having the same signal value. Although in the present embodiment, the image pickup section 1 sends the white balance coefficients to the development section 2 with the RAW data, as mentioned above, white balance coefficients for use in photographing under a standard light source may be set in the development section 2 in advance. Further, the white balance adjustment section 10 may calculate white balance coefficients based on a color temperature input by a user. Further, the white balance adjustment section 10 may calculate white balance coefficients using a method designated by a user when developing data without using white balance coefficients added to the RAW data.

Figure 2:
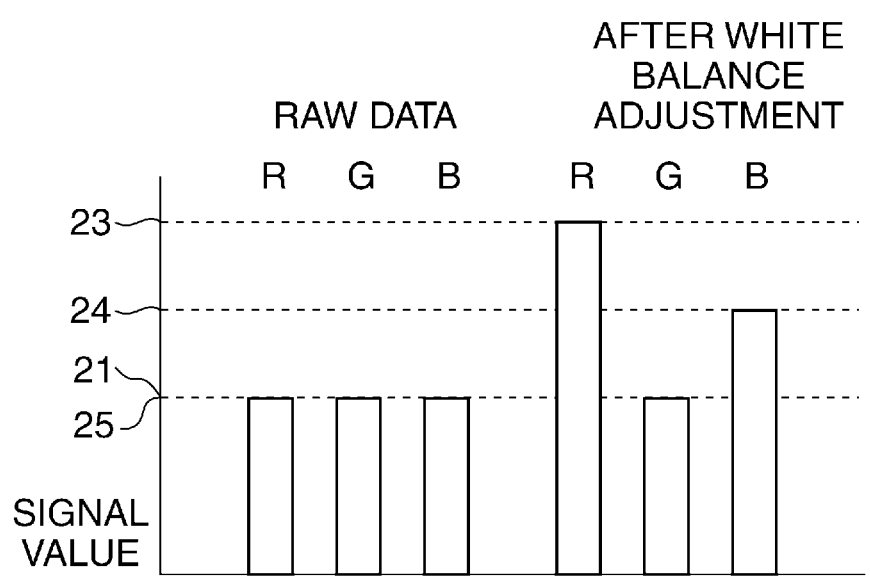
FIG. 2 is a diagram showing an example of white balance adjustment processing performed by a white balance adjustment section appearing in FIG. 1.

FIG. 2 is a diagram showing an example of white balance adjustment processing performed by the white balance adjustment section 10 appearing in FIG. 1. Referring to FIG. 2, the vertical axis represents a magnitude of a signal value of each color signal (R, G, B). As shown in FIG. 2, the RAW data has the color signals R, G, and B, and in this example, a sensor saturation value of the image pickup device (image sensor) is denoted by reference numeral 21. The sensor saturation value 21 is an upper limit value of a signal value of a color signal, which is determined by spectral sensitivity characteristics of the image pickup device, processing accuracy of the image pickup section 1, and a predetermined threshold value. Although in the illustrated example, the sensor saturation value 21 is identical with respect to each of the color signals, the sensor saturation value 21 may be made different for each color signal.

The white balance adjustment section 10 multiplies the RAW data by the white balance coefficients, whereby the signal values after white balance adjustment are obtained. By multiplying the data by the white balance coefficients, the upper limit value of each color signal is changed. In the illustrated example, the white balance coefficient associated with the color signal R is set to "2", the white balance coefficient associated with the color signal B is set to "1.5", and the white balance coefficient associated with the color signal G is set to "1".

The saturation level associated with the color signal R is a saturation level 23, and the saturation level 23 is twice the sensor saturation value 21. The saturation level associated with the color signal B is a saturation level 24, and the saturation level 24 is 1.5 times the sensor saturation value 21. The saturation level associated with the color signal G is a saturation level 25, and the saturation level 25 is equal to the sensor saturation value 21.

Referring again to FIG. 1, the optical correction section 11 performs reduction of the amount of peripheral light caused by the lens included in the image pickup section 1, correction of magnification chromatic aberration, elimination of axial chromatic aberration, and correction of distortion, and so forth. The color interpolation section 12 performs De-Bayer processing or mosaic processing on each of pixels formed by single-color signals. The substitution processor 13 substitutes another color signal for a color signal at a level close to saturation in each pixel. The noise elimination section 14 eliminates luminance noise and color noise by performing filtering processing, layer processing or the like.

The gamma correction section 15 adjusts the contrast and dynamic range of the whole image using a gamma curve. The sharpness processor 16 performs edge enhancement of an image to thereby adjust sharpness of the whole image. The color processor 17 adjusts the hue of an image, and suppresses color curving in a high-luminance area.

Although in the above description, the component elements have been described in a preferable order of processing operations performed by the development section 2, the processing operations by the development section 2 are not required to be performed in the above-described order. However, by performing processing in the above-described order, it is possible to attain the advantageous effects of reducing noise in an image and reducing coloring in the edge portions.

By the way, the optical correction section 11 holds an optical correction table for each type of the lens, each focal length, and each focal position, considering a case where the substitution process is not performed by the substitution processor 13. Therefore, if processing for substituting color signals is performed by the substitution processor 13 before processing by the optical correction section 11, the optical correction results in excessive correction.

For example, if red coloring due to chromatic aberration of the lens is eliminated by substitution processing by the substitution processor 13, since the optical correction section 11 performs correction for emphasizing green so as to eliminate the same amount of red coloring, the image is colored green.

In a case where substitution processing is performed by the substitution processor 13 before execution of correction processing by the optical correction section 11, the optical correction section 11 is required to be provided with the optical correction table in which the effect of reduction of coloring obtained by the substitution processor 13 is taken into account.

Note that the image pickup section 1 may be configured to include part of the components of the development section 2 appearing in FIG. 1 and further, the development section 2 may be configured to include other components.

Figure 3:
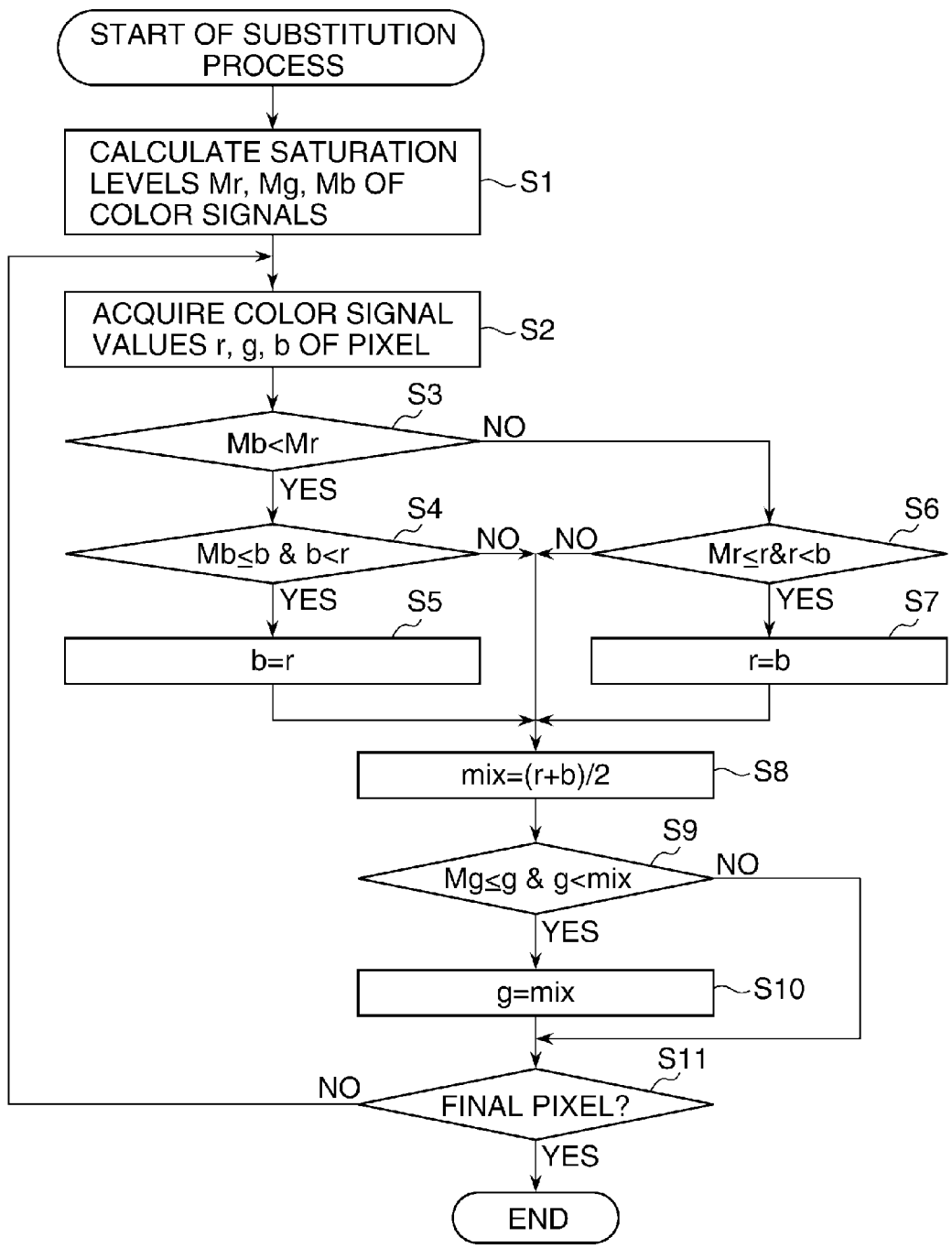
FIG. 3 is a flowchart of a substitution process performed by a substitution processor appearing in FIG. 1.

FIG. 3 is a flowchart of a substitution process performed by the substitution processor 13 appearing in FIG. 1.

In the substitution process in FIG. 3, the description will be given assuming that the saturation level of the color signal G is the lowest, and the saturation level of the color signal R is the highest or the second, in the signal values after the white balance adjustment. By defining the saturation level of each color signal as above, it is possible to omit processing which is unnecessary because of the characteristics of the image pickup section 1 to thereby speed up processing.

When the substitution process is started, the substitution processor 13 determines the saturation level of each color signal in the RAW data (step S1). For example, the substitution processor 13 determines the aforementioned sensor saturation value 21 according to the RAW data. Then, the substitution processor 13 multiplies the sensor saturation value 21 by the respective white balance coefficients used by the white balance adjustment section 10 to thereby calculate the saturation level 23 of the color signal R as Mr, the saturation level 24 of the color signal B as Mb, and the saturation level 25 of the color signal G as Mg.

Then, the substitution processor 13 acquires the signal values (color signal values) r (red), g (green), and b (blue) of the first pixel in the image (i.e. RAW data) (step S2). In a case where De-Bayer processing is not performed by the color interpolation section 12 in advance, the substitution processor 13 determines color signal values for each lacking pixel by referring to pixels surrounding the lacking pixel.

Next, the substitution processor 13 performs the following processing with respect to each pixel of the RAW data: First, the substitution processor 13 compares the saturation level Mr of the color signal R and the saturation level Mb of the color signal B to thereby determine whether or not the saturation level Mb<the saturation level Mr holds (step S3).

If the saturation level Mb<the saturation level Mr holds (YES to the step S3), the substitution processor 13 determines whether or not the color signal value b has reached the saturation level Mb (i.e. Mb≤b), and also the color signal value r is larger than the color signal value b (i.e. b<r) (step S4).

If the saturation level Mb the color signal value b holds and also the color signal value b<color signal value r holds (YES to the step S4), the substitution processor 13 substitutes the color signal value r (substituting signal value) for the color signal value b (substituted signal value). That is, the substitution processor 13 sets the color signal value b equal to the color signal value r (step S5).

If the saturation level Mb the saturation level Mr holds (NO to the step S3), the substitution processor 13 determines whether or not the color signal value r has reached the saturation level Mr (i.e. Mr≤r) and also the color signal value b is larger than the color signal value r (i.e. r<b) (step S6).

If the saturation level Mr the color signal value r holds and also the color signal value r<the color signal value b holds (YES to the step S6), the substitution processor 13 substitutes the color signal value b for the color signal value r. That is, the substitution processor 13 sets the color signal value r equal to the color signal value b (step S7).

Then, the substitution processor 13 calculates a substitution candidate value mix to be substituted for the color signal value g. For example, the substitution processor 13 sets an average value of the color signal value r and the color signal value b as the substitution candidate value mix. That is, the substitution processor 13 sets the substitution candidate value mix equal to a value (r+b)/2 (step S8).

In a case where substitution for the color signal value b has been performed in the step S5, the substitution processor 13 uses the color signal value b after substitution, for calculation of the substitution candidate value mix. By using the color signal value b after substitution, for calculation of the substitution candidate value mix, it is possible to make the saturation level of the color signal value g after substitution uniform with the respective saturation levels of the color signal value r and the color signal value b after substitution.

Further, after normalizing the saturation level Mb of the color signal value b such that it is made equal to the saturation level Mr before performing substitution for the color signal value b in the step S5, the substitution candidate value mix may be set in the step S8 such that the substitution candidate value mix=(r+b·Mr/Mb)/2 holds. By using the color signal value b obtained by normalizing the saturation level Mb to the saturation level Mr, for calculation of the substitution candidate value mix, it is possible to make the saturation level of the color signal value g after substitution uniform with the respective saturation levels of the color signal value r and the color signal value b after substitution.

Similarly, in a case where substitution for the color signal value r has been performed in the step S7, the substitution processor 13 uses the color signal value r after substitution, for calculation of the substitution candidate value mix. By using the color signal value r after substitution, for calculation of the substitution candidate value mix, it is possible to make the saturation level of the color signal value g after substitution uniform with the respective saturation levels of the color signal value b and the color signal value r after substitution. Also in this case, similar to the case described above, after normalizing the saturation level Mr of the color signal value r such that it is made equal to the saturation level Mb before performing substitution for the color signal value r in the step S7, the substitution candidate value mix may be set in the step S8 such that the substitution candidate value mix=(b+r·Mr/Mb)/2 holds.

If the saturation level Mb>the color signal value b holds or the color signal value b color signal value r holds (NO to the step S4), the substitution processor 13 proceeds to the step S8. Similarly, if the saturation level Mr>the color signal value r holds or the color signal value r≥the color signal value b holds (NO to the step S6), the substitution processor 13 proceeds to the step S8.

Then, the substitution processor 13 determines whether or not the color signal value g has reached the saturation level Mg (i.e. Mg≤g) and also the substitution candidate value mix is larger than the color signal value g (i.e. g<mix) (step S9).

If the saturation level Mg≤the color signal value g holds and also the color signal value g<the substitution candidate value mix holds (YES to the step S9), the substitution processor 13 substitutes the substitution candidate value mix for the color signal value g. That is, the substitution processor 13 sets the color signal value g equal to the substitution candidate value mix (step S10). Then, the substitution processor 13 determines whether or not substitution processing is completed for all pixels of the RAW data. That is, the substitution processor 13 determines whether or not substitution processing is completed up to the final pixel of the RAW data (step S11).

If substitution processing is not completed up to the final pixel (NO to the step S11), the substitution processor 13 returns to the step S2, and acquires the color signal values r, g, and b for the next pixel. On the other hand, if substitution processing is completed up to the final pixel (YES to the step S11), the substitution processor 13 terminates the substitution process on the RAW data.

Note that if the saturation level Mg>the color signal value g holds or the color signal value g≥the substitution candidate value mix holds (NO to the step S9), the substitution processor 13 proceeds to the step S11.

The substitution candidate value mix may be calculated using a method other than the above-described one (averaging) in the step S8. For example, the substitution candidate value mix may be obtained using a method of setting the substitution candidate value mix=r·b/(r+b), or may be obtained by larger value selection in which a larger one of the color signal value r and the color signal value b is selected. However, in a case where a calculation method is employed in which the substitution candidate value mix>>the color signal value r or the substitution candidate value mix>>the color signal value b can result, a value obtained by multiplying (the substitution candidate value mix−the color signal value g) by a predetermined coefficient is added to the smaller one of the color signal value r and the color signal value b in the step S10. By thus adding the value added to the color signal value g to the other signal value, it is possible to reduce a change in color ratio due to substitution.

Figure 4A:
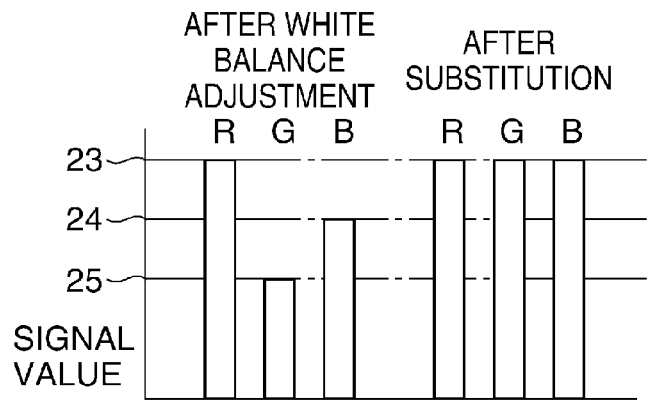
Figure 4B:
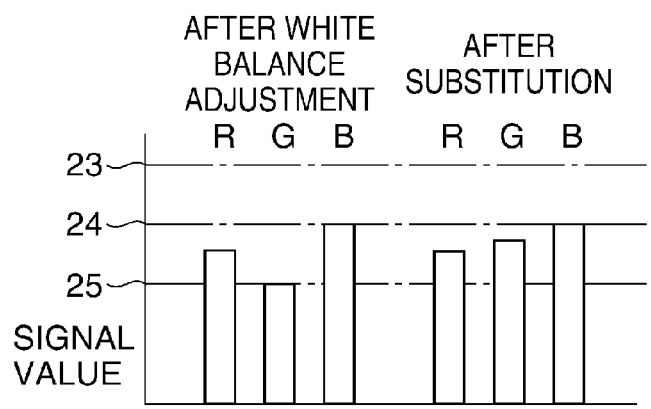
Figure 4C:
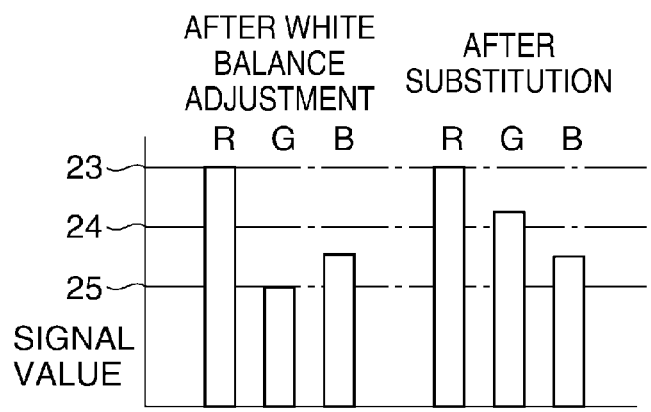
Figure 4D:
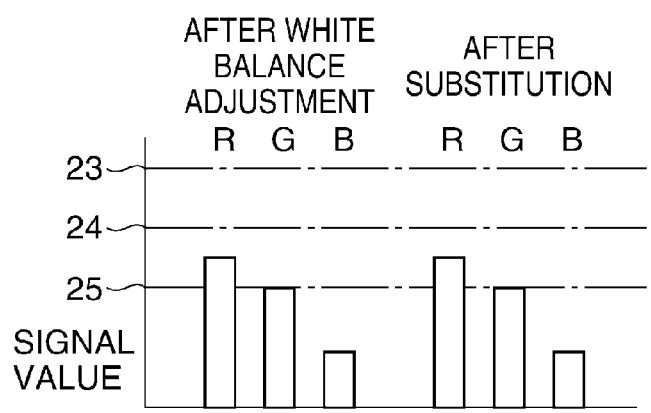

FIGS. 4A to 4D are diagrams useful in explaining the RAW data after substitution, generated by the substitution process shown in FIG. 3, in which FIG. 4A shows a state in which all of the color signals R, G, and B reach the respective saturation levels after white balance adjustment, FIG. 4B shows a state in which the color signals G and B reach the respective saturation levels after white balance adjustment, FIG. 4C shows a state in which the color signals R and G reach the respective saturation levels after white balance adjustment, and FIG. 4D shows a state in which only the color signal G reaches the saturation level after white balance adjustment.

Referring to FIGS. 4A to 4D, the vertical axis in FIGS. 4A to 4D represents the magnitude of a signal value (i.e. color signal value). In the illustrated example in FIG. 4A, all of the signal values of the color signals R, G, and B after white balance adjustment reach the saturation levels 23, 25, and 24, respectively. When the substitution process described with reference to FIG. 3 is performed for the color signals R, G, and B, the color signal R is substituted for the color signal B in the step S5, and further, the substitution candidate value mix is substituted for the color signal G in the step S10. As a result, the signal values of the color signals R, G, and B after substitution reach the saturation level 23.

In the illustrated example in FIG. 4B, the signal values of the color signals G and B after white balance adjustment reach the saturation levels 25 and 24, respectively. When the substitution process described with reference to FIG. 3 is performed for the color signals R, G, and B, it is determined in the step S4 that the color signal R is smaller than the color signal B, and hence substitution for the color signal B is not performed. On the other hand, the substitution candidate value mix is substituted for the color signal G in the step S10.

As a consequence, the signal value of the color signal R after substitution becomes equal to the signal value of the color signal R after white balance adjustment, and the signal value of the color signal G after substitution becomes equal to the average value of the signal values of the color signals R and B after white balance adjustment. Further, the signal value of the color signal B after substitution is equal to the signal value of the color signal B after white balance adjustment.

In the illustrated example in FIG. 4C, the signal values of the color signals R and G after white balance adjustment reach the saturation levels 23 and 25, respectively. When the substitution process described with reference to FIG. 3 is executed for the color signals R, G, and B, it is determined in the step S4 that the color signal B does not reach the saturation level, and hence substitution for the color signal B is not performed. On the other hand, the substitution candidate value mix is substituted for the color signal G in the step S10.

As a consequence, the signal value of the color signal R after substitution is equal to the signal value of the color signal R after white balance adjustment, and the signal value of the color signal G after substitution becomes equal to the average value of the signal values of the color signals R and B after white balance adjustment. Further, the signal value of the color signal B after substitution is equal to the signal value of the color signal B after white balance adjustment.

In the illustrated example in FIG. 4D, the signal value of the color signal G after white balance adjustment reaches the saturation level 25. When the substitution process described with reference to FIG. 3 is executed for the color signals R, G, and B, it is determined in the step S4 that the color signal B does not reach the saturation level, and hence substitution for the color signal B is not performed. On the other hand, it is determined in the step S9 that the substitution candidate value mix is smaller than the signal value of the color signal G, and hence substitution for the color signal G is not performed, either. As a consequence, the signal values of the color signals R, G, and B after substitution are equal to the signal values of the color signals R, G, and B after white balance adjustment.

Figure 5:
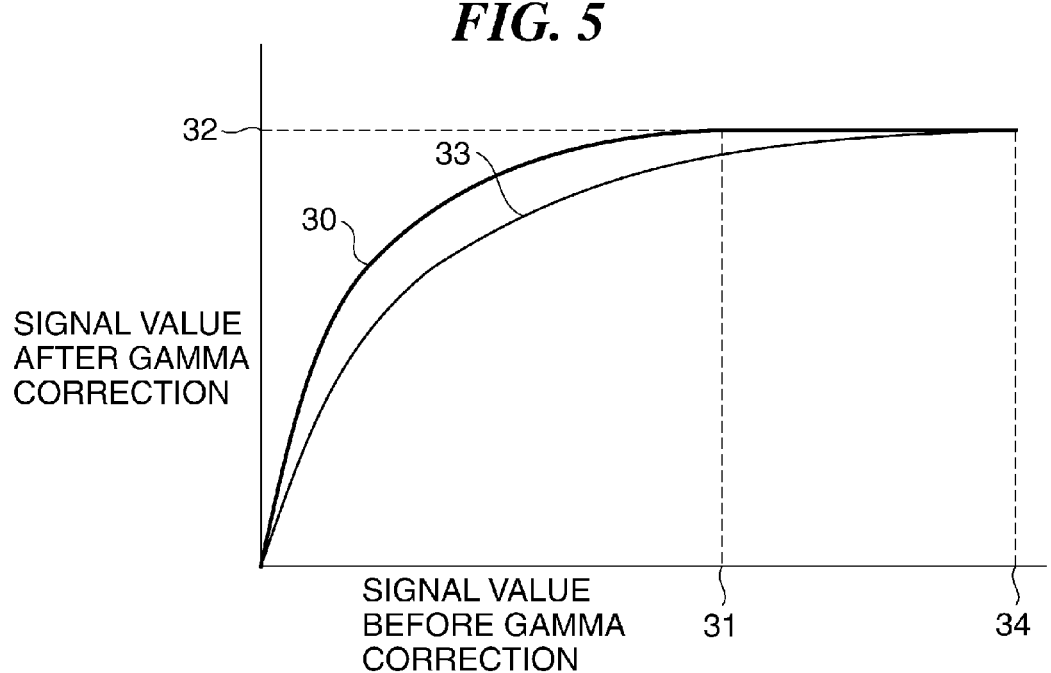
FIG. 5 is a diagram showing an example of a gamma curve used by a gamma correction section appearing in FIG. 1.

FIG. 5 is a diagram showing an example of a gamma curve used by the gamma correction section 15 appearing in FIG. 1.

Referring to FIG. 5, the horizontal axis represents a signal value before gamma correction, and the vertical axis represents a signal value after gamma correction. The gamma curve, denoted by reference numeral 30, indicates a gamma curve used by the gamma correction section 15, which is set with reference to the saturation level 25. The input upper limit value of the gamma curve 30 is denoted by reference numeral 31, and is at the saturation level 25. Further, the output upper limit value of the gamma curve 30 is denoted by reference numeral 32, and is at the saturation level 25. To increase the accuracy of gamma correction, a value larger than the saturation level 25 may be used as the output upper limit value 32. Alternatively, the output upper limit value 32 may be set to a value smaller than the saturation level 25. Note that if the output upper limit value 32 is changed, this influences processing performed after gamma correction, and hence it is necessary to also change processing performed after gamma correction.

The gamma curve, denoted by reference numeral 33, indicates a gamma curve used by the gamma correction section 15 when the substitution process is performed by the substitution processor 13. The input upper limit value of the gamma curve 33 is denoted by reference numeral 34, and is at the maximum saturation level.

The gamma curve 33 is generated by linearly extending the input upper limit value 31 of the gamma curve 30 to the input upper limit value 34. By performing gamma correction using the gamma curve 33, it is possible to cause gradation from the input upper limit value 31 to the input upper limit value 34 to be reflected on the upper limit value 32 of the gamma correction section 15.

Figure 6:
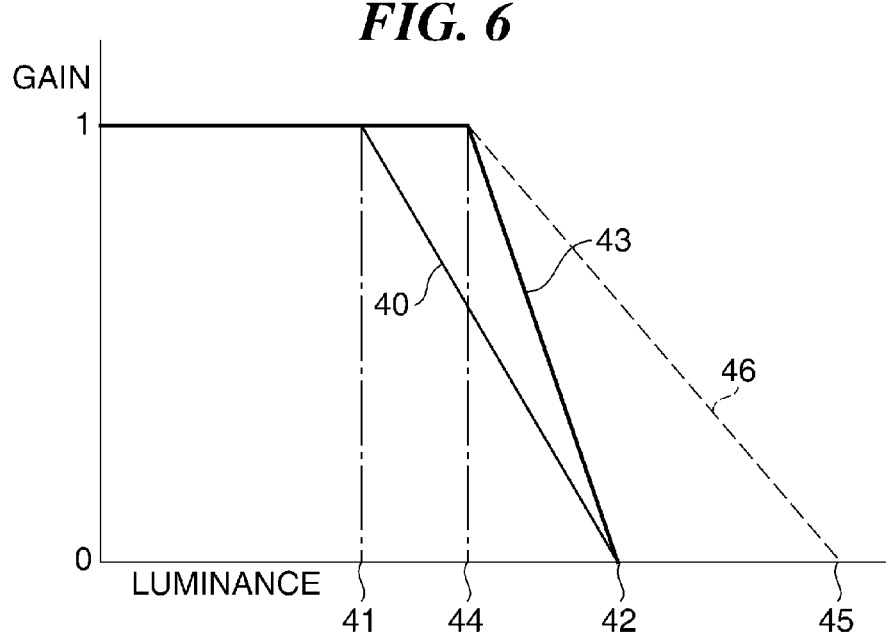
FIG. 6 is a diagram showing an example of a color suppression table used by a color processor appearing in FIG. 1.

FIG. 6 is a diagram showing an example of a color suppression table used by the color processor 17 appearing in FIG. 1.

Referring to FIG. 6, the horizontal axis represents a luminance, and the vertical axis represents a gain for a chroma. The color processor 17 refers to the color suppression table based on the signal values of each pixel of the RAW data, and multiplies the chroma of each pixel by the gain. With this, the color processor 17 suppresses color in the high-luminance area of the image.

The color suppression table, denoted by reference numeral 40, indicates a color suppression table used by the color processor 17, which is set with reference to the saturation level 25. A control point 41 indicates a start point of color suppression in the color suppression table 40. A control point 42 indicates an end point of color suppression in the color suppression table 40. On the color suppression table 40, color suppression is not performed up to the control point 41, a degree of color suppression is gradually increased from the control point 41 to the control point 42, and the color is completely suppressed at and after the control point 42.

The color suppression table, denoted by reference numeral 43, indicates a color suppression table used by the color processor 17 in a case where the substitution process is performed by the substitution processor 13. A control point 44 indicates a start point of color suppression in the color suppression table 43. The color suppression table 43 is generated by linearly extending the control point 41 of the color suppression table 40 to the control point 44. In this example, an extension ratio of the above-mentioned input upper limit value 34 with respect to the input upper limit value 31 is multiplied by a predetermined coefficient to thereby linearly extend the control point 41 up to the control point 44. By using the color suppression table 43, it is possible to weaken color suppression from the control point 41 to the control point 42.

The color suppression table 43 is set considering that each of the color signals is clipped according to the lowest saturation level. When performing the substitution process, the respective saturation levels of the color signals are made uniform at the highest saturation level of them, without performing clipping.

Therefore, by changing the color suppression table 40 set according to the lowest saturation level to the color suppression table 43 which is extended according to the highest saturation level, it is possible to reproduce the chroma which would be lost by clipping the signals and color suppression in the former case.

A control point 45 indicates an end point of color suppression in the color suppression table, denoted by reference numeral 46. The extension ratio of the control point 44 with respect to the control point 41 is multiplied by a predetermined coefficient to thereby linearly extend the control point 42 up to the control point 45, whereby the color suppression table 46 is obtained. By using the color suppression table 46, it is possible to further reproduce the chroma lost by color suppression from the control point 44 to the control point 45.

As described above, according to the first embodiment of the present invention, it is possible to provide the advantageous effects that gradation in a high-luminance area of an image is improved by substitution processing performed by the substitution processor 13, and colors in the high-luminance area can be faithfully reproduced by increasing the gain in the high-luminance area in the color processor 17.

Next, a description will be given of a digital camera which is an image processing apparatus according to a second embodiment of the present invention. The camera according to the second embodiment is the same in configuration as the camera shown in FIG. 1, and hence the same components as those of the first embodiment are denoted by the same reference numerals, with description thereof omitted.

Figure 7:
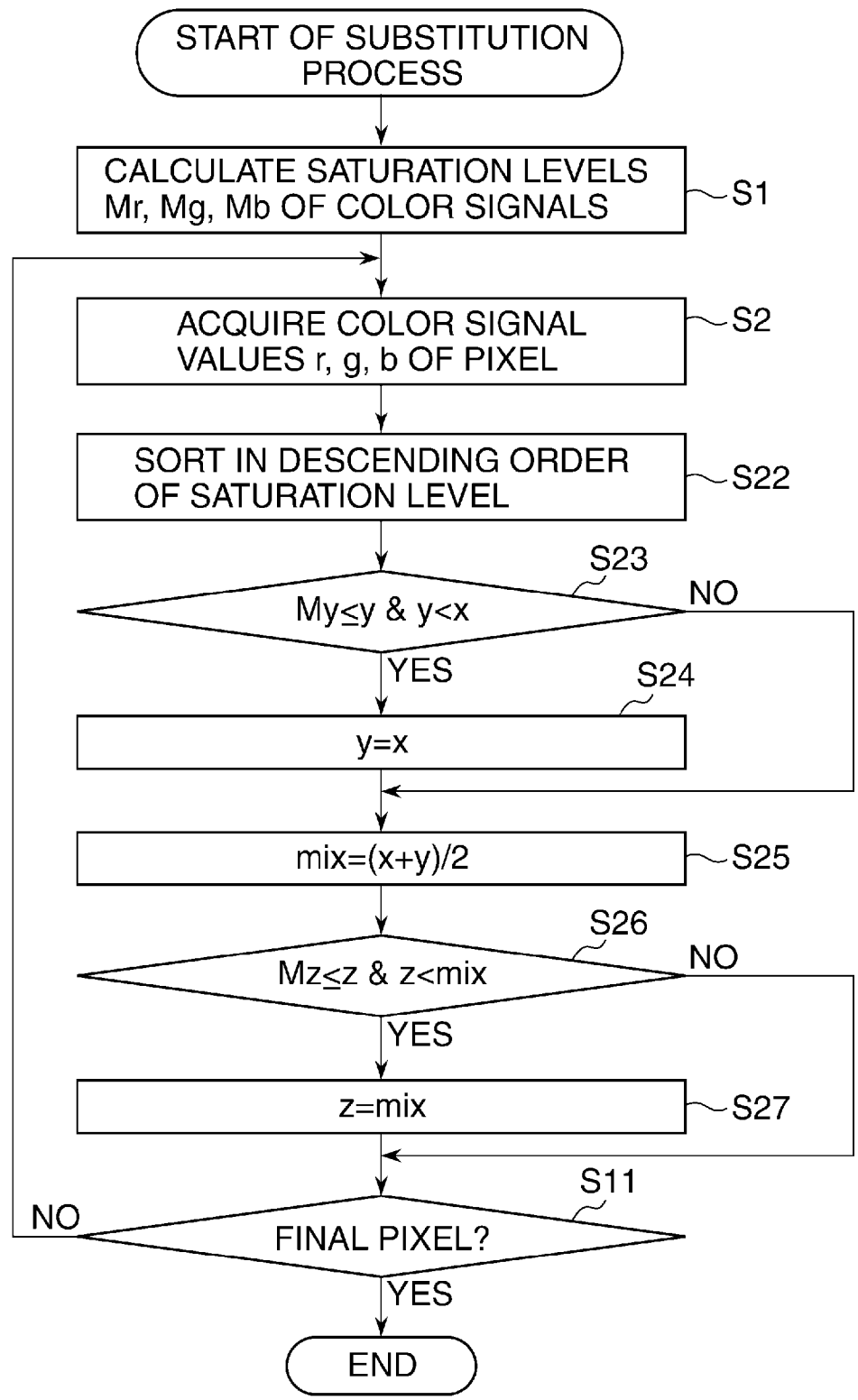
FIG. 7 is a flowchart of a substitution process performed by a substitution processor of an image pickup apparatus (digital camera) which is as an image processing apparatus according to a second embodiment of the present invention.

FIG. 7 is a flowchart of a substitution process performed by the substitution processor 13 of the camera which is the image processing apparatus according to the second embodiment.

In the substitution process in FIG. 7, the same steps as those of the substitution process in FIG. 3 are denoted by the same step numbers, and description thereof is omitted.

When the substitution process is started, the substitution processor 13 executes the steps S1 and S2 described with reference to FIG. 3. Then, the substitution processor 13 performs the following processing for each pixel of the RAW data: First, the substitution processor 13 rearranges the saturation levels Mr, Mg, and Mb, and the color signal values r, g, and b, to the saturation levels Mx, My, and Mz, and the color signal values x, y, and z, in descending order of the saturation level. That is, the substitution processor 13 performs sorting of the values in descending order of the saturation level (step S22).

Note that symbols used in the description of the second embodiment are associated with those of the saturation levels shown in FIG. 2, such that Mx=Mr, My=Mb, Mz=Mg, x=r, y=b, and z=g.

Then, the substitution processor 13 determines whether or not the color signal value y has reached the saturation level My (i.e. My≤y) and also the color signal value x is larger than the color signal value y (i.e. y<x) (step S23).

If the saturation level My≤the color signal value y holds and also the color signal value y<the color signal value x holds (YES to the step S23), the substitution processor 13 substitutes the color signal value x for the color signal value y (step S24). That is, the substitution processor 13 sets the color signal value y equal to the color signal value x.

Then, the substitution processor 13 calculates the substitution candidate value mix to be substituted for the color signal value z (step S25). In this step, the substitution processor 13 calculates the substitution candidate value mix as an average value of the color signal value x and the color signal value y (mix=(x+y)/2).

If the saturation level My>the color signal value y holds or the color signal value y≥the color signal value x holds (NO to the step S23), the substitution processor 13 proceeds to the step S25 without performing substitution.

In a case where substitution for the color signal value y has been performed in the step S24, the color signal value y after substitution is used for calculation of the substitution candidate value mix. By using the color signal value y after substitution for calculation of the substitution candidate value mix, it is possible to make the saturation level of the color signal value z after substitution uniform with the respective saturation levels of the color signal value x and the color signal value y after substitution.

Then, the substitution processor 13 determines whether or not the color signal value z has reached the saturation level Mz (i.e. Mz≤z) and also the substitution candidate value mix is larger than the color signal value z (i.e. z<mix) (step S26).

If the saturation level Mz≤the color signal value z holds and the color signal value z<the substitution candidate value mix holds (YES to the step S26), the substitution processor 13 substitutes the substitution candidate value mix for the color signal value z (step S27). That is, the substitution processor 13 sets the color signal value z equal to the substitution candidate value mix. Then, the substitution processor 13 proceeds to the step S11 described with reference to FIG. 3.

Note that if the saturation level Mz>the color signal value z holds or the color signal value z≥the substitution candidate value mix holds (NO to the step S26), the substitution processor 13 proceeds to the step S11.

Figure 8A:
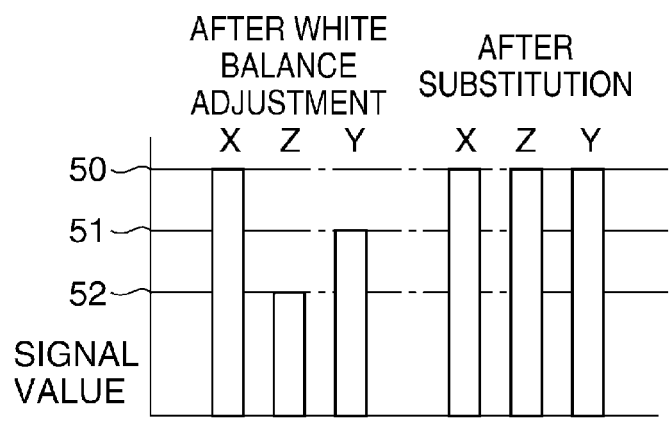
Figure 8B:
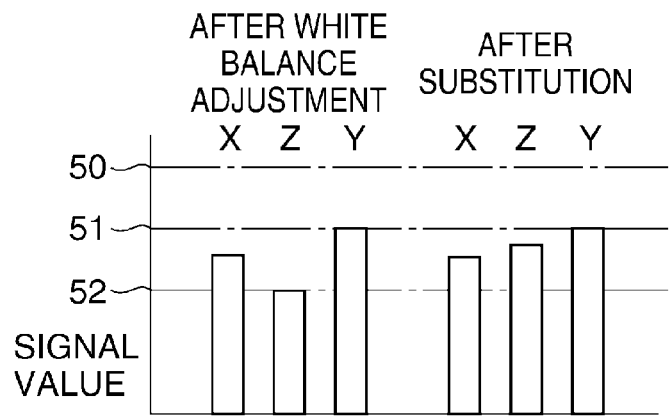
Figure 8C:
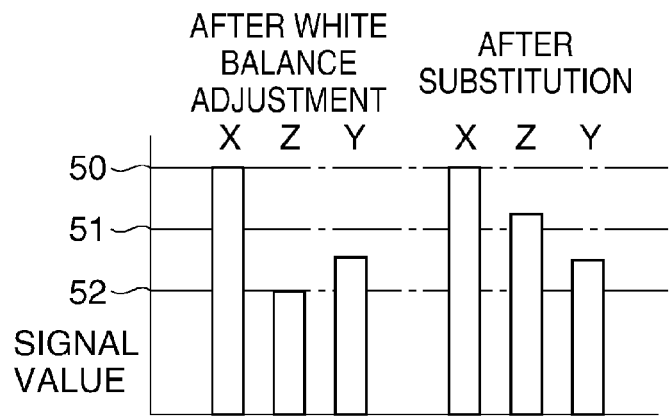
Figure 8D:
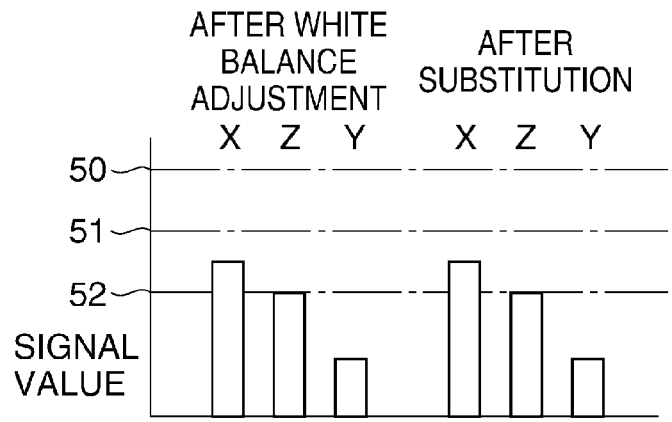

FIGS. 8A to 8D are diagrams useful in explaining RAW data after substitution, generated by the substitution process shown in FIG. 7, in which FIG. 8A shows a state in which all of color signals X, Y and Z reach the respective saturation levels after white balance adjustment, FIG. 8B shows an example of a state where the color signals Y and Z reach the respective saturation levels after white balance adjustment, FIG. 8C shows a state in which the color signals X and Z reach the respective saturation levels after white balance adjustment, and FIG. 8D shows a state in which only the color signal Z reaches the saturation level after white balance adjustment.

In FIGS. 8A to 8D, the vertical axis represents the magnitude of a signal value, and a saturation level 50 is the saturation level Mx of the color signal X. Further, a saturation level 51 is the saturation level My of the color signal Y, and a saturation level 52 is the saturation level Mz of the color signal Z.

In the illustrated example in FIG. 8A, all of the signal values of the color signals X, Z, and Y after white balance adjustment reach the saturation levels 50, 52, and 51, respectively. When the substitution process described with reference to FIG. 7 is performed for the color signals X, Z, and Y, the color signal X is substituted for the color signal Y in the step S24, and further, the substitution candidate value mix is substituted for the color signal Z in the step S27. As a result, the signal values of the color signals X, Z, and Y after substitution reach the saturation level 50.

In the illustrated example in FIG. 8B, the signal values of the color signals Z and Y after white balance adjustment reach the saturation levels 52 and 51, respectively. When the substitution process described with reference to FIG. 7 is performed for the color signals X, Z, and Y, it is determined in the step S23 that the color signal X is smaller than the color signal Y, and hence substitution for the color signal Y is not performed. On the other hand, the substitution candidate value mix is substituted for the color signal Z in the step S27.

As a consequence, the signal value of the color signal X after substitution is equal to the signal value of the color signal X after white balance adjustment, and the signal value of the color signal Z after substitution becomes equal to an average value of the signal values of the color signals X and Y after white balance adjustment. Further, the signal value of the color signal Y after substitution is equal to the signal value of the color signal Y after white balance adjustment.

In the illustrated example in FIG. 8C, the signal values of the color signals X and Z after white balance adjustment reach the saturation levels 50 and 52, respectively. When the substitution process described with reference to FIG. 7 is performed for the color signals X, Z, and Y, it is determined in the step S23 that the color signal Y is not saturated, and hence substitution for the color signal Y is not performed. On the other hand, the substitution candidate value mix is substituted for the color signal Z in the step S27.

As a consequence, the signal value of the color signal X after substitution is equal to the signal value of the color signal X after white balance adjustment, and the signal value of the color signal Z after substitution becomes equal to an average value of the signal values of the color signals X and Y after white balance adjustment. Further, the signal value of the color signal Y after substitution is equal to the signal value of the color signal Y after white balance adjustment.

In the illustrated example in FIG. 8D, the signal value of the color signal Z after white balance adjustment reaches the saturation level 52. When the substitution process described with reference to FIG. 7 is performed for the color signals X, Z, and Y, it is determined in the step S23 that the color signal Y is not saturated, and hence substitution for the color signal Y is not performed. On the other hand, it is determined in the step S26 that the substitution candidate value mix is smaller than the signal value of the color signal Z, and hence substitution for the color signal Z is not performed, either. As a result, the signal values of the color signals X, Z, and Y after substitution are equal to the signal values of the color signals X, Z, and Y after the white balance adjustment.

In the second embodiment, the processing operations performed by the gamma correction section 15 and the color processor 17 are the same as those described in the first embodiment, and hence description thereof is omitted.

As descried above, according to the second embodiment, since substitution processing is performed by sorting the color signals in the order of the saturation level, even when the saturation level of the color signal G is higher than the saturation levels of the color signals R and B, gradation in the high-luminance area is improved by substitution processing performed by the substitution processor 13. Further, by weakening color suppression by the color processor 17, it is possible to faithfully express colors in the high-luminance area.

Next, a description will be given of a digital camera which is an image processing apparatus according to a third embodiment of the present invention. The camera according to the third embodiment is the same in configuration as the camera shown in FIG. 1, and hence the same components as those of the first embodiment are denoted by the same reference numerals, with description thereof omitted.

Figure 9:
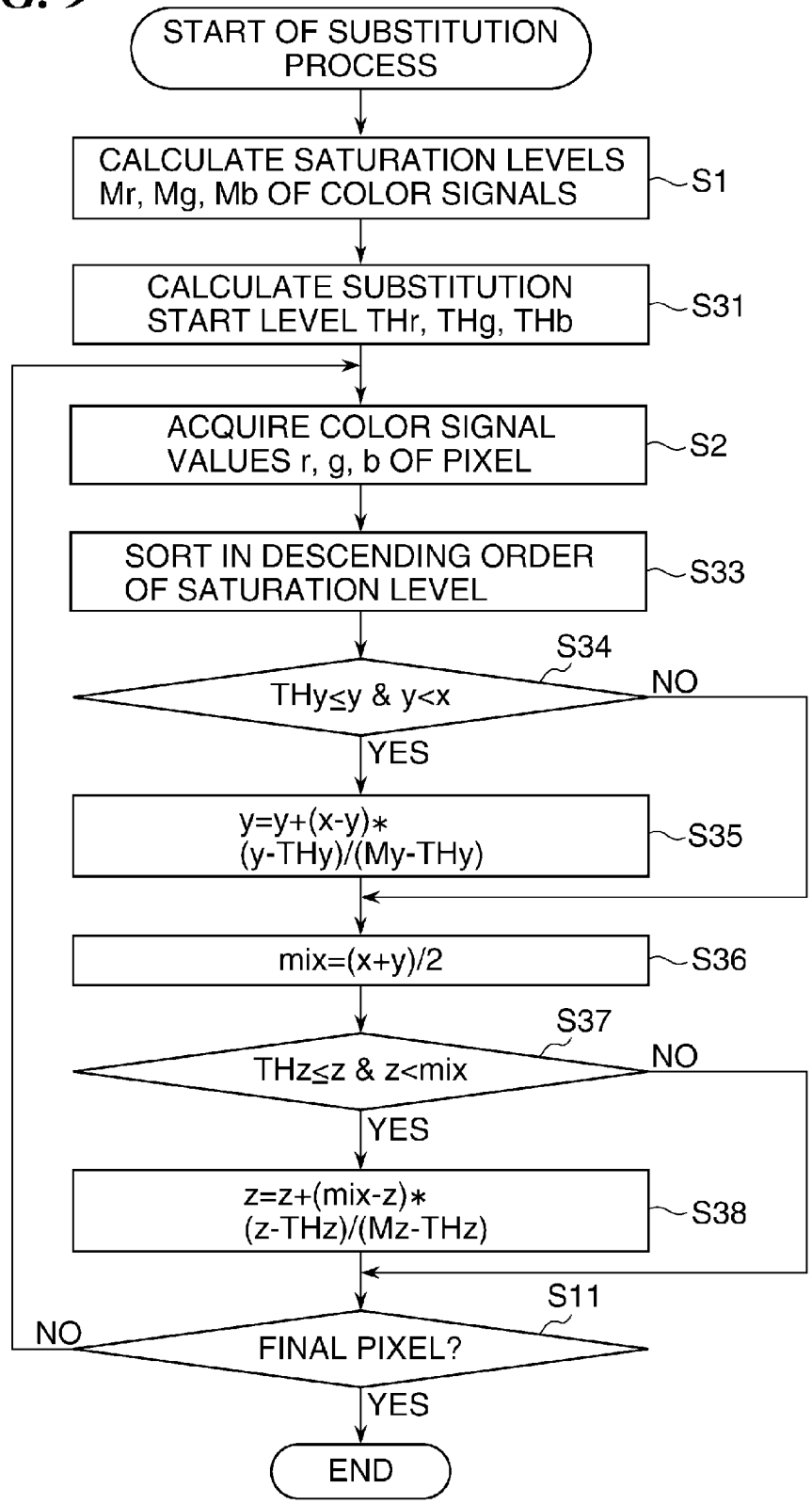
FIG. 9 is a flowchart of a substitution process performed by a substitution processor of an image pickup apparatus (digital camera) which is an image processing apparatus according to a third embodiment of the present invention.

FIG. 9 is a flowchart of a substitution process performed by the substitution processor 13 of the camera which is the image processing apparatus according to the third embodiment.

In the substitution process in FIG. 9, the same steps as those of the substitution process in FIG. 3 are denoted by the same step numbers, and description thereof is omitted.

When the substitution process is started, the substitution processor 13 executes the step S1 described with reference to FIG. 3. Then, the substitution processor 13 calculates threshold values THr, THg, and THb for determining the start of substitution, based on a predetermined value p set in advance and the saturation levels Mr, Mg, and Mb (step S31).

For example, when a ratio with respect to the saturation levels Mr, Mg, and Mb is set as the predetermined value (also referred to as the coefficient) p, the substitution processor 13 calculates the threshold values THr, THg, and THb by THr=p×Mr, THb=p×Mb, and THg=p×Mg. The coefficient p is used for increasing and decreasing a range (influence range) within which the substitution has influence on the color signal value so as to eliminate tone jump.

As the coefficient p is smaller, the influence range is larger, and when the coefficient p is equal to 0, the substitution influences all color signal values. On the other hand, as the coefficient p is larger, the influence range is smaller, and when the coefficient p is equal to 1, the substitution is performed only on the saturation values of the color signal values.

Assuming that the coefficient p is equal to 0.7, substitution is performed for color signal values which exceed 70% of the saturation level of each color signal value. Note that the threshold values may be determined by subtracting a predetermined value q from the saturation levels Mr, Mg, and Mb, respectively, and further, the predetermined value p or q may be set on a color signal-by-color signal basis.

After execution of the step S31, the substitution processor 13 executes the step S2 described with reference to FIG. 3.

Then, the substitution processor 13 rearranges the saturation levels Mr, Mg, and Mb, the color signal values r, g, and b, and the threshold values THr, THg, and THb, to the saturation levels Mx, My, and Mz, the color signal values x, y, and z, and the threshold values THx, THy, and THz, in descending order of the saturation level. That is, the substitution processor 13 performs sorting of the values in descending order of the saturation level (step S33).

Note that symbols used in the description of the second embodiment are associated with those of the saturation levels shown in FIG. 2, such that Mx=Mr, My=Mb, Mz=Mg, x=r, y=b, and z=g, THx=THr, THy=THb, and THz=THg.

Then, the substitution processor 13 determines whether or not the color signal value y has reached the threshold value THy (i.e. THy≤y) and also the color signal value x is larger than the color signal value y (i.e. y<x) (step S34).

If the threshold value THy≤the color signal value y holds and also the color signal value y<the color signal value x holds (YES to the step S34), the substitution processor 13 substitutes the color signal value x for the color signal value y (step S35). In this example, the substitution processor 13 makes the substitution ratio with respect to the color signal value x higher as the color signal value y is closer to the saturation level. For example, the substitution processor 13 multiplies a difference between the color signal value x and the color signal value y by the substitution ratio obtained by dividing a difference between the color signal value y and the threshold value THy by a difference between the saturation level My and the threshold value THy, and then adds the multiplication result to the color signal value y. That is, the substitution processor 13 substitutes a value of $\{y+(x-y)\times(y-THy)/(My-THy)\}$ for the color signal value y (step S35).

Then, the substitution processor 13 calculates the substitution candidate value mix to be substituted for the color signal value z (step S36). Here, the substitution processor 13 calculates the substitution candidate value mix as an average value of the color signal value x and the color signal value y (mix=(x+y)/2).

If the threshold value THy>the color signal value y holds or the color signal value y≥the color signal value x holds (NO to the step S34), the substitution processor 13 proceeds to the step S36 without performing substitution.

In a case where substitution for the color signal value y has been performed in the step S35, the color signal value y after substitution is used for calculation of the substitution candidate value mix. By using the color signal value y after substitution for calculation of the substitution candidate value mix, it is possible to make the saturation level of the color signal value z after substitution uniform with the saturation levels of the color signal value x and the color signal value y after substitution.

Next, the substitution processor 13 determines whether or not the color signal value z has reached the threshold value THz (i.e. THz≤z) and also the substitution candidate value mix is larger than the color signal value z (i.e. z<mix) (step S37).

If the threshold value THz≤the color signal value z holds and also the color signal value z<the substitution candidate value mix (YES to the step S37), the substitution processor 13 substitutes the substitution candidate value mix for the color signal value z. Here, the substitution processor 13 makes the substitution ratio with respect to the substitution candidate value mix higher as the color signal value z is closer to the saturation level. For example, the substitution processor 13 multiplies a difference between the substitution candidate value mix and the color signal value z by the substitution ratio obtained by dividing a difference between the color signal value z and the threshold value THz by a difference between the saturation level Mz and the threshold value THz, and then adds the multiplication result to the color signal value z. That is, the substitution processor 13 substitutes a value of $\{z+(mix-z)\times(z-THz)/(Mz-THz)\}$ for the color signal value z (step S38). Then, the substitution processor 13 proceeds to the step S11 described with reference to FIG. 3.

Note that if the threshold value THz>the color signal value z holds or the color signal value z≥the substitution candidate value mix holds (NO to the step S37), the substitution processor 13 proceeds to the step S11.

Figure 10:
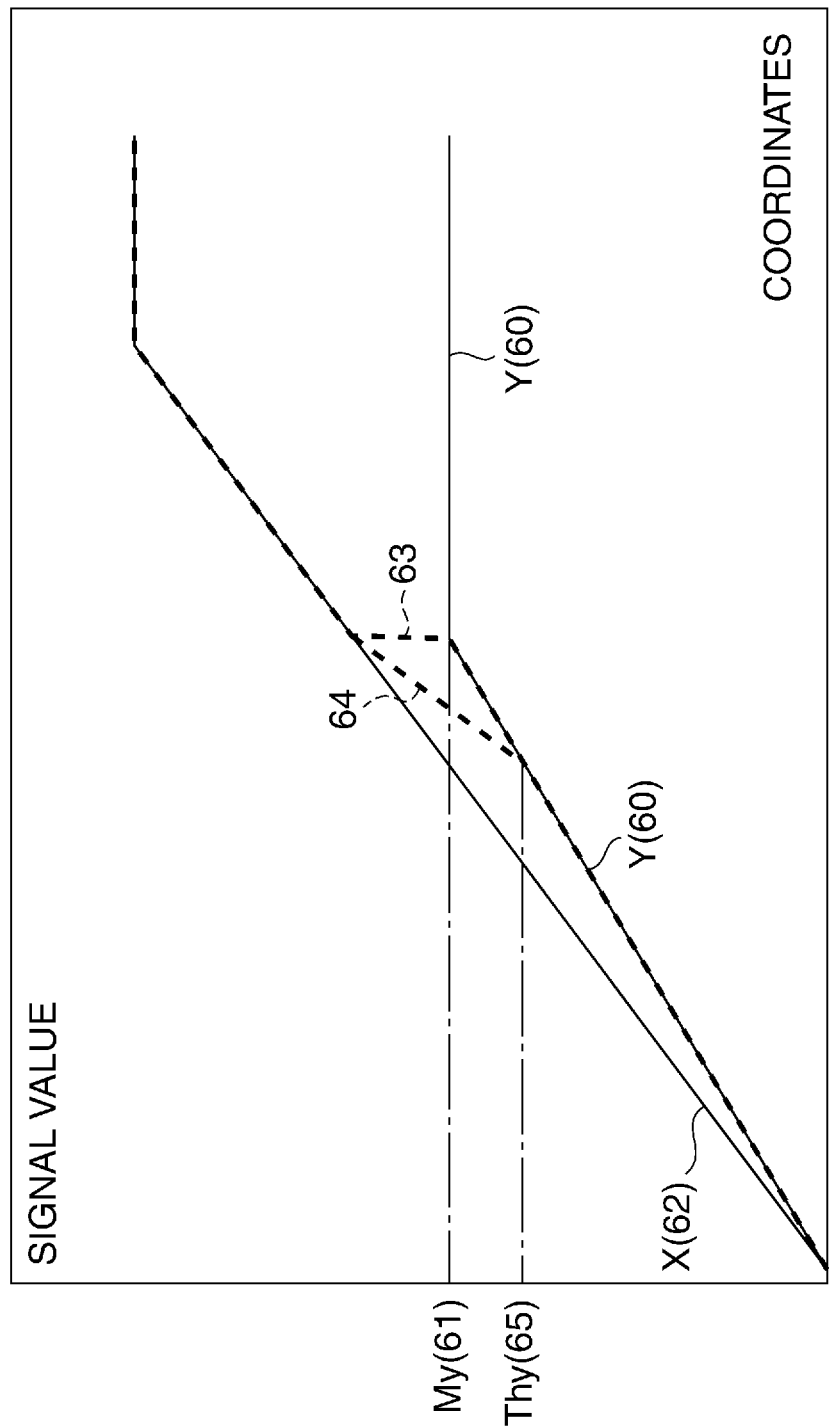
FIG. 10 is a diagram showing an example of results of substitution performed by adjusting a substitution ratio in the substitution process shown in FIG. 9.

FIG. 10 is a diagram showing an example of a substitution result obtained after adjusting the substitution ratio in the substitution process described with reference to FIG. 9.

FIG. 10 shows a result of execution of the step S35 in FIG. 9 (substitution result), and in the illustrated example, the RAW data has gradation in which the luminance gradually becomes higher from left to right, as viewed in FIG. 10. In FIG. 10, the horizontal axis represents coordinates of the RAW data in the horizontal direction, and the vertical axis represents output after substitution processing (substitution result, i.e. signal value).

The color signal Y before substitution is denoted by reference numeral Y (60), and the saturation level My of the color signal Y is denoted by reference numeral My (61). Further, the color signal X is denoted by reference numeral X (62), and the result of substitution for the color signal Y described in the step S24 in FIG. 7 is denoted by reference numeral 63.

When the color signal Y (60) before substitution reaches the saturation level My (61), the signal value is largely changed by substituting the color signal X. This change appears in the result of development as so-called tone jump.

In the substitution process described with reference to FIG. 9, when the color signal Y (60) before substitution reaches the threshold value, denoted by reference numeral THy (65), substitution of the color signal X for the color signal Y is started. Then, the result of substitution performed in the step S35 for the color signal Y, denoted by reference numeral 64, shows that as the color signal Y (60) before substitution is closer to the saturation level My, the substitution ratio with respect to the color signal X becomes higher, and when the color signal Y (60) is saturated, the color signal X is substituted for the color signal Y (i.e. Y=X).

In the third embodiment, the processing operations performed by the gamma correction section 15 and the color processor 17 are the same as those described in the first embodiment, and hence description thereof is omitted.

Further, although in FIG. 10, the step S35 has been described, i.e. the case where the color signal X is substituted for the color signal Y has been described, by replacing the color signal X (62) with the substitution candidate value mix calculated in the step S36, and the color signal Y (60) with the color signal Z, tone jump of the color signal Z is eliminated in the step S38 in the similar manner.

As described above, according to the third embodiment of the present invention, the threshold value for starting substitution processing is set and the substitution ratio is made higher as the signal value is closer to the saturation level, and hence the color signal value continuously changes between the pixels, which makes it possible to eliminate tone jump.

Here, an example of the RAW data obtained by the above-described substitution processing will be described.

Figure 11A:
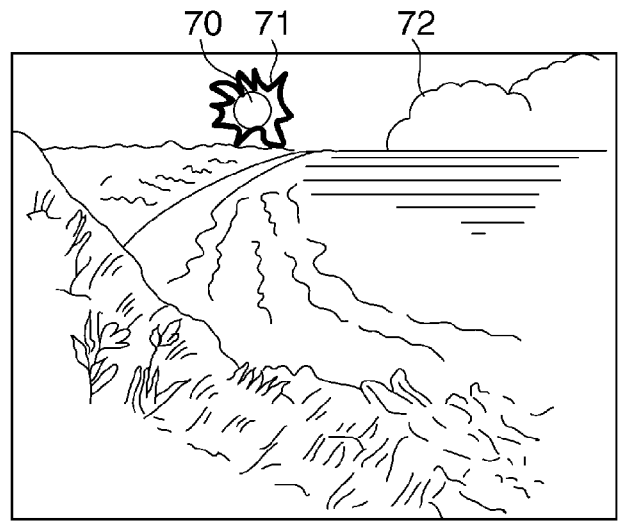
Figure 11B:
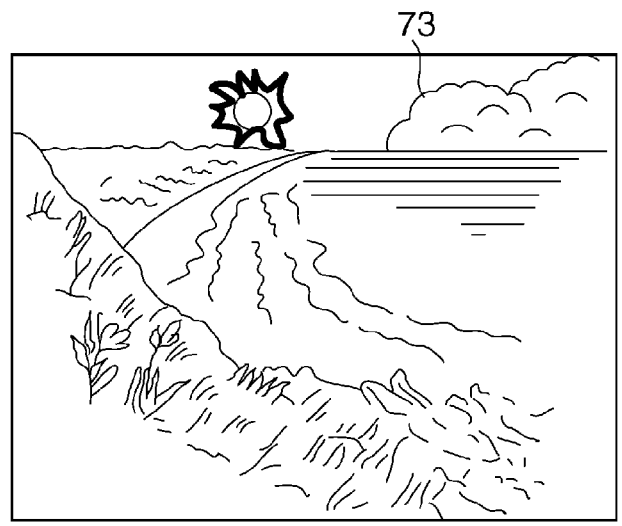
Figure 11C:
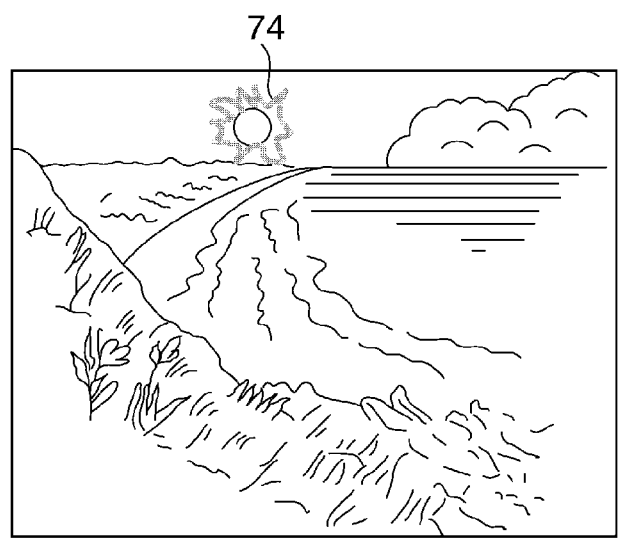

FIGS. 11A to 11C are diagrams useful in explaining improvement of gradation in a high-luminance area, obtained by substitution processing performed by the development section 2 appearing in FIG. 1, in which FIG. 11A shows a conventional development result, FIG. 11B shows a development result obtained by the second embodiment, and FIG. 11C shows a development result obtained by the third embodiment.

Referring to FIGS. 11A to 11C, flare 71 is generated around the sun, denoted by reference numeral 70, and further, a cloud 72 which reflects light of the sun 70 exists. At least the sun 70, the flare 71, and the cloud 72 are the high-luminance areas.

In the result (FIG. 11A) of development in which the signal is clipped according to the smallest one of the color signals after white balance adjustment, the dynamic range is insufficient, so that the cloud 72 appears as blown-out highlights. On the other hand, in the development result shown in FIG. 11B, it is possible to make maximum use of gradation of the RAW data, so that it is possible to resolve the cloud (to express gradation of the cloud) as indicated by reference numeral 73.

Further, in the development result shown in FIG. 11C, the color signal exceeding the threshold value is subjected to gradual substitution processing, and hence it is possible to accurately express the flare, denoted by reference numeral 74, existing around the sun 70 without causing tone jump.

As is clear from the above description, in the illustrated example in FIG. 1, the substitution processor 13 functions as a saturation level calculation unit, a pixel information acquisition unit, a determination unit, and a substitution processing unit. Further, at least the noise elimination section 14, the gamma correction section 15, the sharpness processor 16, and the color processor 17 function as a development processing unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Although in the above-described embodiments, the image pickup apparatus (camera) is taken as an example of the image processing apparatus, the image processing apparatus may be a personal computer, a tablet terminal, a smartphone, a monitor, a scanner, a printer, or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-031631 filed Feb. 21, 2014, which is hereby incorporated by reference herein in its entirety.

What is claimed is:

1. An image processing apparatus that acquires developed data by developing photographed data, comprising:
a saturation level calculation unit configured to calculate a respective saturation level of each of three color signals of the photographed data;
a pixel information acquisition unit configured to acquire a respective signal value of each of the three color signals in each pixel of the photographed data as pixel information;
a determination unit configured to compare the respective saturation levels of the three color signals with one another and determine, as substituted color signals, (a) a color signal of the three color signals having the second highest saturation level of the respective saturation levels of the three color signals, and (b) a color signal of the three color signals having the third highest saturation level of the respective saturation levels of the three color signals;
a substitution processing unit configured to, in a case where the color signal having the second highest saturation level reaches its respective saturation level and its respective signal value is smaller than the respective signal value of a color signal of the three color signals having the highest saturation level of the saturation levels of the three color signals, perform substitution of the respective signal value of the color signal having the highest saturation level for the respective signal value of the color signal having the second highest saturation level, and perform substitution for the respective signal value of the color signal having the third highest saturation level using the respective signal value of the color signal having the highest saturation level and the respective signal value of the color signal having the second highest saturation level; and
a development processing unit configured to perform predetermined processing on photographed data on which the substitutions have been performed by said substitution processing unit to thereby generate the developed data.

2. The image processing apparatus according to claim 1, wherein said saturation level calculation unit is configured to calculate the respective saturation levels based on saturation values of an image pickup device with which the photographed data is acquired and a white balance coefficient used for adjusting a white balance of the photographed data.

3. The image processing apparatus according to claim 1, wherein said development processing unit includes a gamma correction unit configured to correct a contrast and a dynamic range of an image, and
wherein said gamma correction unit is configured to linearly extend a gamma curve according to a highest saturation level, and to correct the contrast and the dynamic range according to the extended gamma curve.

4. The image processing apparatus according to claim 1, wherein said development processing unit includes a color processing unit configured to adjust a hue of an image and suppress color curving in a high-luminance area of an image, and
wherein said color processing unit is configured to linearly extend a color suppression table according to a highest saturation level to thereby adjust the hue and suppress the color curving in the high-luminance area according to the extended color suppression table.

5. The image processing apparatus according to claim 1, wherein said determination unit is configured to set a respective threshold value for each of the three color signals according to the respective saturation level thereof, and to determine whether or not to perform a particular substitution for each of at least one of the three color signals, based on at least one of the respective threshold values and the pixel information.

6. The image processing apparatus according to claim 5, wherein, when it is determined by said determination unit that the particular substitution is to be performed for at least a particular color signal of the three color signals, which has its respective signal value exceeding its respective threshold value, said substitution processing unit is configured to increase a substitution ratio as the particular color signal is closer to the respective saturation level, and to perform the particular substitution according to the substitution ratio.

7. The image processing apparatus according to claim 6, wherein said substitution processing unit is configured to perform the particular substitution according to a multiplication result obtained by multiplying a difference between a color signal as a substituted signal and a color signal as a substituting signal by the substitution ratio.

8. The image processing apparatus according to claim 1, further comprising an optical correction unit configured to perform reduction of an amount of peripheral light caused by a lens included in an image pickup section for acquiring the photographed data, as well as perform correction of magnification chromatic aberration, elimination of axial chromatic aberration, and correction of distortion.

9. The image processing apparatus according to claim 8, wherein said substitution processing unit is configured to perform the substitutions on the photographed data that is corrected by said optical correction unit.

10. The image processing apparatus according to claim 8, wherein said optical correction unit is configured to perform the reduction of the amount of peripheral light, as well as to perform the correction of magnification chromatic aberration, the elimination of axial chromatic aberration, and the correction of distortion, with respect to photographed data on which substitution processing has been performed by said substitution processing unit.

11. The image processing apparatus according to claim 1, wherein said development processing unit includes a noise elimination unit configured to eliminate luminance noise and color noise, by performing filtering processing or layer processing with respect to photographed data on which substitution processing has been performed by said substitution processing unit.

12. An image processing method for acquiring developed data by developing photographed data, comprising:
    calculating a respective saturation level of each of three color signals of the photographed data;
    acquiring a respective signal value of each of the three color signals in each pixel of the photographed data as pixel information;
    comparing the respective saturation levels of the three color signals with one another and determining, as substituted color signals, (a) a color signal of the three color signals having the second highest saturation level of the respective saturation levels of the three color signals, and (b) a color signal of the three color signals having the third highest saturation level of the respective saturation levels of the three color signals;
    performing, in a case where the color signal having the second highest saturation level reaches its respective saturation level and its respective signal value is smaller than the respective signal value of a color signal of the three color signals having the highest saturation level of the saturation levels of the three color signals, (1) substitution of the respective signal value of the color signal having the highest saturation level for the respective signal value of the color signal having the second highest saturation level, and (2) substitution for the respective signal value of the color signal having the third highest saturation level using the respective signal value of the color signal having the highest saturation level and the respective signal value of the color signal having the second highest saturation level; and
    performing predetermined processing on photographed data on which the substitutions have been performed, to thereby generate the developed data.

13. A non-transitory computer-readable storage medium storing a computer-executable control program for causing a computer to execute a method of controlling an image processing apparatus that acquires developed data by developing photographed data,
    wherein the method comprises:
    calculating a respective saturation level of each of three color signals of the photographed data;
    acquiring a respective signal value of each of the three color signals in each pixel of the photographed data as pixel information;
    comparing the respective saturation levels of the three color signals with one another and determining, as substituted color signals, (a) a color signal of the three color signals having the second highest saturation level of the respective saturation levels of the three color signals, and (b) a color signal of the three color signals having the third highest saturation level of the respective saturation levels of the three color signals;
    performing, in a case where the color signal having the second highest saturation level reaches its respective saturation level and its respective signal value is smaller than the respective signal value of a color signal of the three color signals having the highest saturation level of the saturation levels of the three color signals, (1) substitution of the respective signal value of the color signal having the highest saturation level for the respective signal value of the color signal having the second highest saturation level, and (2) substitution for the respective signal value of the color signal having the third highest saturation level using the respective signal value of the color signal having the highest saturation level and the respective signal value of the color signal having the second highest saturation level; and
    performing predetermined processing on photographed data on which the substitutions have been performed, to thereby generate the developed data.

14. An image processing apparatus that acquires developed data by developing photographed data, comprising:
    at least one memory device storing a program; and
    at least one processor communicatively connected to the at least one memory device, the at least one processor configured by the program at least to:
    calculate a respective saturation level of each of three color signals of the photographed data;
    acquire a respective signal value of each of the three color signals in each pixel of the photographed data as pixel information;
    compare the respective saturation levels of the three color signals with one another and determine, as substituted color signals, (a) a color signal of the three color signals having the second highest saturation level of the respective saturation levels of the three color signals, and (b) a color signal of the three color signals having the third highest saturation level of the respective saturation levels of the three color signals;
    perform, in a case where the color signal having the second highest saturation level reaches its respective saturation level and its respective signal value is smaller than the respective signal value of a color signal of the three color signals having the highest saturation level of the saturation levels of the three color signals, (1) substitution of the respective signal value of the color signal having the highest saturation level for the respective signal value of the color signal having the second highest saturation level, and (2)

substitution for the respective signal value of the color signal having the third highest saturation level using the respective signal value of the color signal having the highest saturation level and the respective signal value of the color signal having the second highest saturation level; and perform predetermined processing on photographed data on which the substitutions have been performed, to thereby generate the developed data.

\* \* \* \* \*